United States Patent [19]

Martin et al.

[11] Patent Number: 4,782,727
[45] Date of Patent: Nov. 8, 1988

[54] PROCESS OF REPLACING A SLEEVE MOUNTED WITHIN A PIPE, AND DEVICES FOR CARRYING OUT THAT PROCESS

[75] Inventors: Alain Martin, Lyons; Philippe Maillard, Marcy l'Etoile, both of France

[73] Assignee: Framatome & Cie., Courbevoie, France

[21] Appl. No.: 39,200

[22] Filed: Apr. 16, 1987

Related U.S. Application Data

[62] Division of Ser. No. 709,270, Mar. 7, 1985, Pat. No. 4,682,725.

[51] Int. Cl.[4] .............................................. B23B 5/00
[52] U.S. Cl. ...................................... 82/4 C; 82/70.2; 82/100
[58] Field of Search ................ 82/4 C, 48, 57, 70.2, 82/100

[56] References Cited

U.S. PATENT DOCUMENTS

| | | | |
|---|---|---|---|
| 3,546,988 | 12/1970 | Behnke | 82/4 C |
| 3,807,047 | 4/1974 | Sherer et al. | 30/97 |
| 4,271,733 | 6/1981 | Stone | 82/4 C |
| 4,322,991 | 4/1982 | Feamster | 82/4 R |
| 4,385,535 | 5/1983 | Tedder | 82/4 R |
| 4,532,837 | 8/1985 | Cushenberry et al. | 82/4 C |
| 4,624,052 | 11/1986 | Garcia et al. | 30/97 |
| 4,648,294 | 3/1987 | Jacquot et al. | 82/4 R |

FOREIGN PATENT DOCUMENTS 890815 3/1962 United Kingdom ................ 82/4 C Primary Examiner—Frederick R. Schmidt
Assistant Examiner—William E. Terrell
Attorney, Agent, or Firm—Pollock, Vande Sande & Priddy

[57] ABSTRACT

Apparatus for replacing thermal sleeves in pressurized-water nuclear power station circuits in a rapid, automatic manner producing minimal debris. A two-part frame is fixed to the outer wall of the sleeve coaxially therewith, each part of the frame carried one part of a two-part rotatable element, which in turn carries a support for a cross-cutting tool. The tool support is moved toward the axis of the frame but stopped just before the too breaks into the interior space of the sleeve.

2 Claims, 8 Drawing Sheets

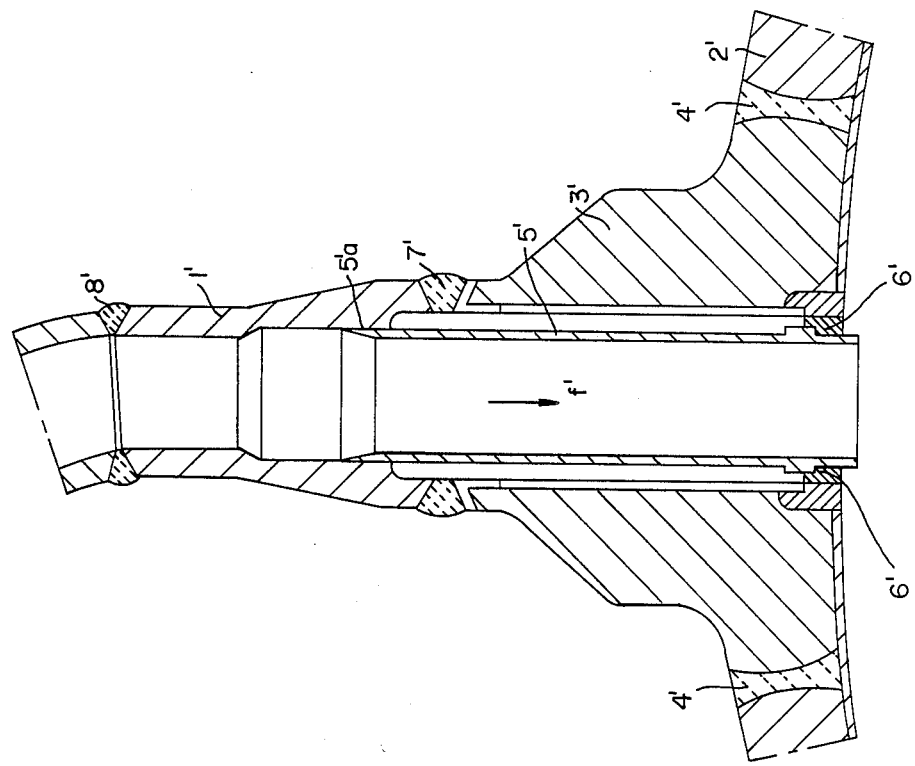
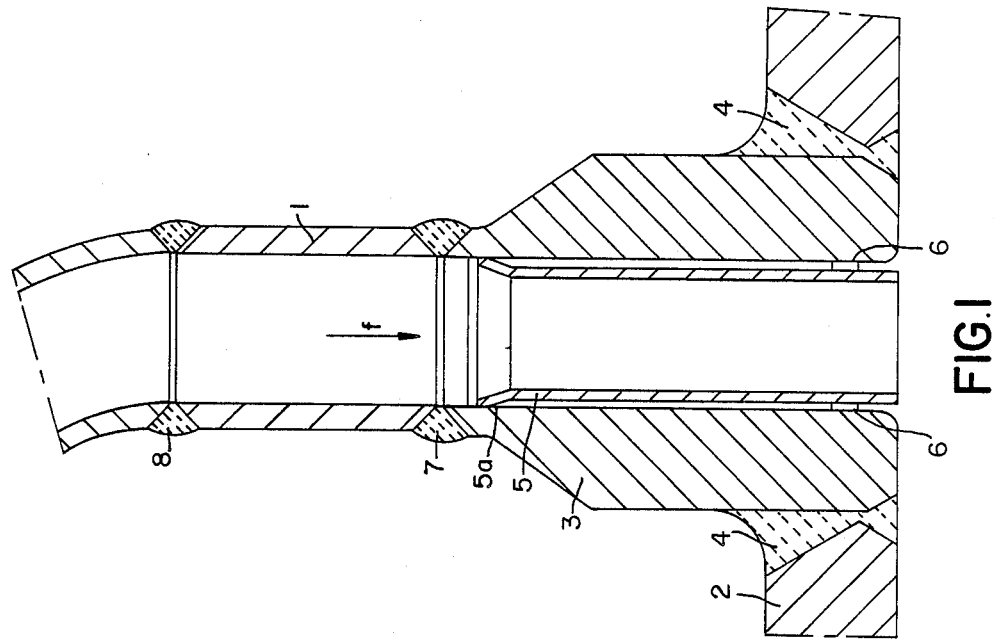

PROCESS OF REPLACING A SLEEVE MOUNTED WITHIN A PIPE, AND DEVICES FOR CARRYING OUT THAT PROCESS

This is a Divisional Application of pending prior application Ser. No. 709,270, filed Mar. 7, 1985, now U.S. Pat. No. 4,682,725.

FIELD OF THE INVENTION

The invention relates to a device for performing a cross cutting operation with removal of material of a pipe.

The invention is applicable in particular to the replacement of thermal sleeves in the circuits of pressurized-water nuclear power stations, in which such replacements must be carried out as perfectly as possible, in the shortest possible time, and producing a minimum of debris.

In these circuits, certain pipes are subjected to large thermal shocks, particularly in the vicinity of the connections between two pipes.

For example, there exists a large temperature difference between the feed pipe of the primary circuits (temperature of 300° C. and pressure of 155 bars) and the pipes for return of primary fluid into the primary circuit, for example after sampling by the circuit for volumetric and chemical control (VCC) the purpose of which is in particular to dose certain additives such as boron and to demineralize the water of the primary circuit if need be: the temperature of the return pipe is about 50° C. and its pressure approximates 5 bars.

Likewise, a great temperature difference exists between the pressurizer, which is a reservoir containing water and gas and enables one to raise the pressure in the primary circuit to a pressure of about 155 bars, and the sprinkler pipe of the pressurized which, by lowering the temperature of the gas, permits lowering likewise the pressure provided by the pressurizer. When the temperature of the pressurizer is about 300° C., the temperature to which the sprinkler pipe is brought is about 50° C.

PRIOR ART

The large difference in temperature between two pipes, or one pipe and the pressurizer, involves very violent thermal shocks in the locality of connecting welds betweens the two pipes, or the pipe and the pressurizer. In order to create transients, it is known to provide thermal sleeves, i.e. a cylindrical jacket creating a double internal wall for the pipe which has the weld liable to be subjected to thermal shocks. For example, one can refer to French Pat. No. 2,442,361, in the name of the present assignee, which shows thermal sleeves welded in the vicinity of the connection of two pipes.

Reference may also be made to FIGS. 1 and 2 of the present application, which show pipes provided with sleeves.

FIG. 1 shows the connection of a pipe 1 to another pipe 2. To make this connection, the pipe 1 has been prolonged by a connector 3 which has been welded at 4 onto the pipe 2. So as to protect the welds 4, a thermal sleeve 5 has been welded at 5a onto the connector 3. The pipes 1 and 2 may be any pipes, but in particular they can constitute, in the case of the pipe 1, the pipe for return of primary fluid from the VCC circuit into the primary circuit, and in the case of the pipe 2, the primary pipe.

FIG. 2 is analogous to FIG. 1. A pipe 1' has been welded onto a pipe 2'. For this purpose, the pipe 1' has been extended by a connector 3' which has been welded at 4' to the pipe 2'. In this figure, the sleeve 5' for protection of the welds 4', has, however, been welded at 5'a to the pipe 1', not to the connector 3'.

In these two figures, the thermal sleeve 5 or 5' is kept spaced, by means of damping blocks 6 or 6', from the pipe in the interior of which it is placed.

The substantial speeds of circulation of fluid, the latter circulating in the direction indicated by the arrows f and f' respectively in FIGS. 1 and 2, cause turbulences, which in their turn generate vibrations which are amplified at the time of their propagation and which can also be in resonance; these vibrations then may succeed in cracking the welds 5a or 5'a of the sleeves 5 or 5' on the pipes 1 or 1'.

The replacement of these sleeves may prove necessary in nuclear reactors which have been in the use of several years. The operation is made complex by the fact that the devices used for the replacement of sleeves must be automated because, on the one hand, the sites are radioactive and one must therefore limit as much as possible the time during which workers are at these sites, and on the other hand, the networks of fluid and electric circuits are very dense and make dense and make complicate access to the pipes to be repaired. Furthermore, during replacement of the sleeves, one must avoid debris, such as swarf, falling into the pipes and subsequently causing damage to the correct functioning of the reactor.

SUMMARY OF THE INVENTION

That is why the invention has as its object a process of replacing thermal sleeves which process is automatic, rapid and very clean. It also has as its object various devices for carrying out that process.

The invention relates to a process of replacing a sleeve mounted within a pipe, welded to the internal wall of the pipe at one of its ends, and kept spaced from the internal wall of the pipe by blocks at the other end.

The process according to the invention consists in making a pair of cross cuts in the pipe, one at least of these two cross cuts being made upstream of the weld of the sleeve to the pipe, withdrawing the section thus obtained and the sleeve, machining chamfers on the free ends of the pipe, checking the position and the geometry of the blocks, welding into the gap in the pipe a new section, onto the internal wall of which one of the ends of a new sleeve has previously been welded, this sleeve having been machined in accordance with the position and the geometry of the blocks, so that there is minimum play between the blocks and the free end of the sleeve.

According to a particular variant of the process according to this invention, this consists in making the two cuts upstream of the weld of the sleeve onto the pipe, and, after withdrawal of the section and before withdrawal of the sleeve, removing the line of welding of the sleeve onto the pipe.

The process according to the invention is also one in which each of the cross cuts is made in two operations, with removal of material, then by displacement of the material, so as to avoid penetration of debris into the interior of the pipe during opening up.

The invention likewise relates to a device for performing the cross cutting operation with removal of material in accordance with the process according to the invention.

This device comprises:

(1) a frame in two parts intended to be fixed around the external wall of the pipe in such a way that its axis coincides with the axis of the pipe;

(2) a rotating part in two parts, each carried by one part of the frame, rotatable about the axis of the frame;

(3) at least one support for a cross cutting tool carried by the rotating part but capable of translation towards the axis of the frame;

(4) means for turning the rotating part about the axis of the frame;

(5) means for feeding the tool holder towards the axis of the frame;

(6) means for stopping the feeding movement of the tool support before the tool can break into the interior of the pipe.

In one particular embodiment of this device, the means for feeding the tool support are constituted by a worm capable of being driven in rotation by a fork, the free end of which has a roller capable of moving on a circular track on the frame, means placed on the said track to raise the roller at each revolution made by the rotating part, and means for turning the worm in a single direction corresponding to the feed of the tool support towards the axis of the frame.

Preferably, the means for stopping the feeding movement of the tool support are constituted by an indicator fixed to the tool support, a detector of the position of the indicator, fixed to the frame, and means for controlling the stopping of the feeding movement of the tool support when the indicator reaches a predetermined position.

According to a variant, the means for stopping the feeding movement of the tool holder further comprise an auxiliary indicator capable of advancing at the same time as the indicator fixed to the tool support, along the same line but in the direction opposite to the direction of advance of the tool support, the detector being intended to detect the position of the auxiliary indicator.

The invention also relates to a device for machining chamfers on the free ends of the pipe, in accordance with the process according to the invention.

This device includes:

(1) a frame having means for centering and fixing the latter in the interior of the pipe in such a way that its axis coincides with that of the pipe;

(2) a tool support mounted concentrically around the frame, capable of translation along the axis of the frame and rotatable about the axis of the frame;

(3) means for causing translation of the tool support along the axis of the frame;

(4) means for turning the tool support about the axis of the frame;

(5) means for detecting the position of the frame along the axis of the pipe and (6) means for detecting the position of the tool support along the axis of the frame.

According to a particular feature, this device includes a cup for recovery of debris, intended to be centered and fixed in the interior of the pipe, and to constitute also a depth stop for the lower end of the frame.

The invention equally concerns a device for checking the position and the geometry of the blocks in accordance with the process according to the invention.

This device includes:

(1) a frame having means for centering and fixing the latter in the interior of the pipe in such a way that its axis coincides with the axis of the pipe, and traversed by a longitudinal passage;

(2) a support placed in the said passage in such a way that its axis coincides with the axis of the frame, movable within the frame along its axis and rotatable about its axis;

(3) a feeler at the end of the support, capable of translation relative to the support perpendicularly to the axis of the support, against a spring, upon contact with the blocks to be checked;

(4) means for causing translation of the support along its axis in such a way that the feeler can move along the entire height of the blocks;

(5) means for turning the support about its axis in such a way that the feeler can move along the entire circumference of the pipe;

(6) means for detecting the position of the support along its axis at each moment;

(7) means for detecting the angular position of the support at each moment;

(8) means for detecting the position of the feeler along its axis of displacement at each moment.

In a preferred embodiment of this device, the support is traversed by a longitudinal passage, and the feeler is constituted by a ball displaceable in contact with the blocks in a bore made at the end of the support, perpendicularly to the axis of the latter; the means for detecting the position of the ball at each moment are constituted by:

(1) a stem within the passage and slidable in the interior of the latter;

(2) a parabolic vane fixed to the end of the stem;

(3) a spring for urging the vane against the ball;

(4) a pick-up at the upper end of the stem for detecting the position of the stem along its axis.

According to a particular feature of this device, the means for turning the support about its axis also constitute the means for moving the support along its axis, the support including an external thread over one part of its length, to which corresponds an internal thread on the frame.

The invention equally relates to a device for removal of a line of welding in accordance with the variant of the process according to the invention.

This device includes:

(1) a frame intended to be fixed around the pipe in such a way that its axis coincides with the axis of the pipe;

(2) a tool support mounted on the frame in such a way that its axis coincides with that of the frame, capable of translation along its axis; and rotation about its axis, (3) means for moving the tool support along its axis;

(4) means for turning the tool support about its axis;

(5) a tool holder mounted on the tool support and capable of translation relative to the latter along an axis perpendicular to the axis of the tool support;

(6) means for moving the tool holder along its displacement axis;

(7) means for detecting the displacements of the tool support along its axis;

(8) means for detecting the displacement of the tool holder along its displacement axis;

(9) means for recovery of debris from machining of the line of welding, intended to be placed downstream of the line of welding.

In a preferred embodiment of this device, the means for recovery of debris are constituted by an inverted umbrella of inflatable rubber.

According to a particular feature of this device, the umbrella is carried by a tubular support having means for centering the latter in the interior of the pipe and traversed by a passage for inflation of the umbrella.

According to a second particular feature of this device, the latter includes a stem, coaxial with the tubular support, slidable in the interior of the latter, and having one of its ends fixed to the bottom of a casing in such a way that the umbrella can fold up into the casing before withdrawal from the pipe.

BRIEF DESCRIPTION OF THE DRAWINGS

So as to be better understood, the invention will now be described in a more precise manner with reference to the accompanying drawings which show, purely by way of example, a preferred embodiment of the devices according to the invention.

FIGS. 1 and 2, which have already been described above, each show, in longitudinal section, a pipe carrying a thermal sleeve which it is desired to change.

In FIG. 1, the thermal sleeve is welded to the connector which extends the pipe carrying the sleeve.

In FIG. 2, the thermal sleeve is welded to the pipe itself.

FIG. 4a shows the upper part of this device, whereas FIG. 4b shows the lower part of it.

FIG. 6a shows the frame, the tool holder and the tool support, i.e. the upper part of the device.

FIG. 6b shows the device for the recovery of debris, i.e. the lower part of the device.

FIG. 6c shows, in an enlarged view, the way of fixing the device for recovery of debris to the frame.

DETAILED DESCRIPTION

Figure 3:
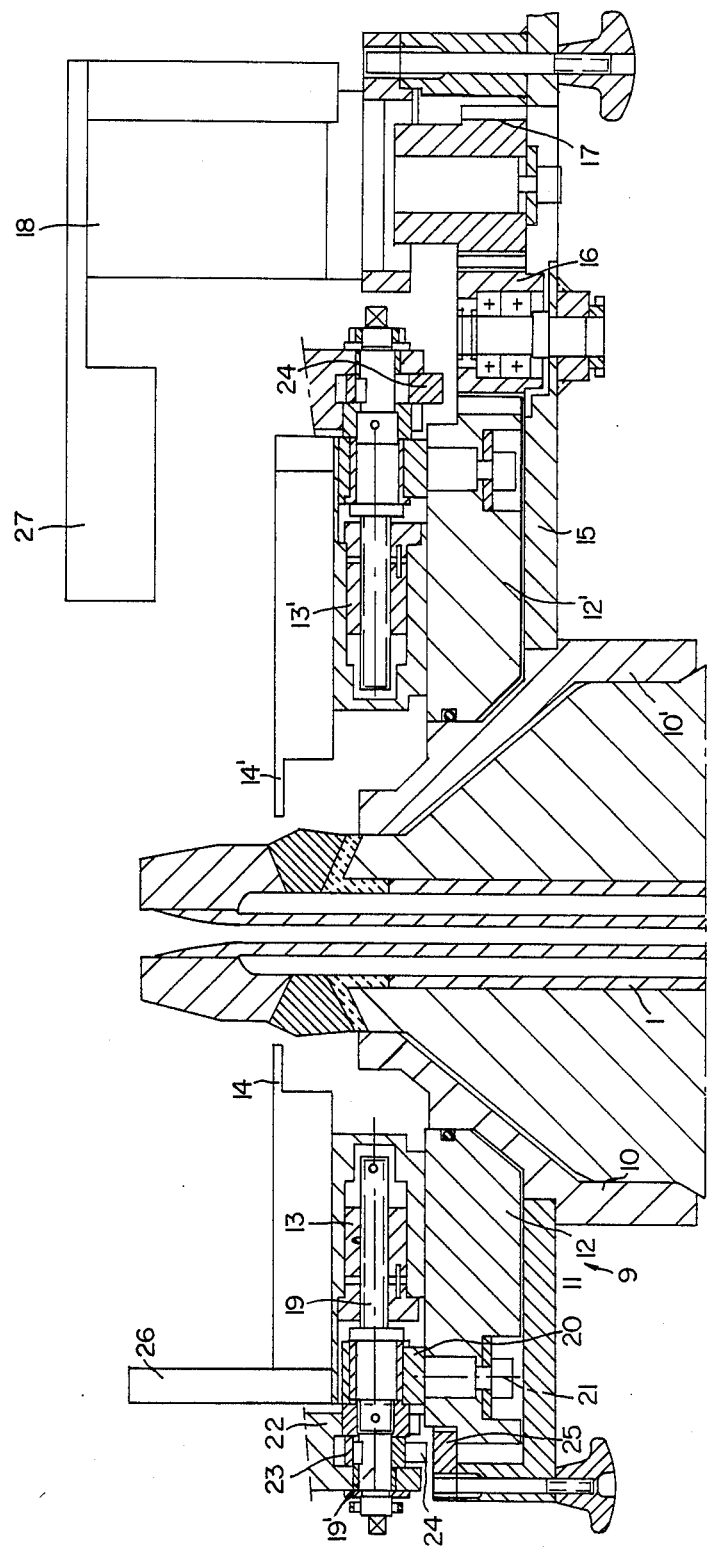
FIG. 3 shows a device for carrying out the cross cutting operation with removal of material, in accordance with the process according to the invention.

Reference is made first to FIG. 3.

This figure shows a device for carrying out the cross cutting operation with removal of material in accordance with the process according to the invention. This device enables one to make a pair of cross cuts in the pipe 1 or 1' of FIGS. 1 or 2. These cross cuts are made, for example, at levels 7 and 8 in FIG. 1, or 7' and 8' in FIG. 2; they are preferably made at the level of a weld, but can certainly be made at other levels on the pipe 1 or 1', provided that one can remove a section of pipe 1 or 1' sufficient to be able to withdraw the sleeve, work on the pipe, and emplace another sleeve. One at least of these cuts should be made upstream of the weld 5a or 5'a of the sleeve 5 or 5' onto the pipe 1 or 1'. In FIG. 2 only one of the cuts, that made at the level 8', will be made upstream of the weld 5'a of the sleeve 5' onto the pipe 1', the cut 7' being made downstream of that weld 5'a. When the section obtained is withdrawn, then the sleeve 5' is withdrawn at the same time.

On the contrary, in FIG. 1, the two cuts are made upstream of the weld 5a of the sleeve 5 onto the pipe 1; once the section obtained has been withdrawn, it will then be necessary to start machining the line of welding of the sleeve onto the pipe, in order to be able to withdraw the sleeve.

The cutting device of FIG. 3 in face permits production of only one of the two operations enabling cross cutting of the pipes 1 or 1'. In fact, provision is made for cross cutting these pipes in two operations, one with removal of material, performed by means of the device of FIG. 3, and the other by displacement of the material, performed by hand, for example with the help of a pipe cutter. The second operation only occurs at the very end of the cross cutting, and its purpose is solely to avoid debris penetrating into the pipe 1 or 1'.

The device of FIG. 3, permitting performance of the cross cutting operation with removal of material, includes a frame 9 in two parts 10 and 10'; this frame 9 is intended to be fixed around the external wall of the pipe, in such a way that its axis coincides with the axis of the pipe. The pipe has been identified as 1 but the latter could equally have been identified by 1', according to whether the cross cutting is carried out on the pipe of FIG. 1 or of FIG. 2.

The device also includes a rotating number 11 in two parts 12 and 12', each carried by one of the parts 10 or 10' of the frame 9; this rotating part 11 is rotatable about the axis of the frame 9.

The device also includes two tool supports 13 and 13', carried by the rotating part 12 but capable of translation relative to the latter towards the axis of the frame 9. The tool supports 13 and 13' each carry a cross cutting tool 14 and 14'.

The two parts 12 and 12' of the rotating part 11 are in fact constituted by two toothed semi-crowns held together by two bolts, and can turn freely on a supporting track 15 of the frame 9.

The toothed part of the rotating part 11 meshes with a reduction pinion 16, which itself is driven in rotation by the driving pinion 17 of a hydraulic motor 18.

The tool support 13 is fed towards the axis of the frame by means of a worm 19 turning in a bearing ring 20 fixed on the rotating part 11 at 21. The worm 19 is extended by a shaft 19' which carries via two bearings a fork 22, which can only drive the shaft 19' in a single direction of rotation, thanks to a toothed wheel 23 provided with a pawl.

The free end of the fork 22 has a small roller 24 capable of moving on a circular track 25 on the frame 9.

Means not shown, such as a cam fitted with a cam face of saddleback form, placed on the circular track 25, raise the small roller 24 at each revolution made by the rotating part 11 and hence by the roller 25. Each time that the small roller is lifted, it causes pivoting of the fork and thus a rotation of the shaft 19' and of the worm 19. The rotation of the worm 19 causes a feeding movement of the tool support 13. This feeding, which occurs in a regular manner, at every revolution of the tool, enables production of a circular incision in the pipe 1.

In order to foresee the need to stop the tools 14 and 14' before the tools break into the pipe 1 and introduce debris into the interior of the pipe 1, means are provided for stopping the feeding movement of the tool support 13 or 13'. These means are constituted by an indicator 26 fixed to the tool support 13, and, fixed to the frame, a detector 27 of the position of the indicator 26. This detector is, for example, a photo-electric detector. Means, not shown, control the stopping of the motor 18 as soon as the indicator has reached a predetermined position dependent on the thickness of the pipe 1 at the level at which the cutting is carried out.

The cutting operation is then completed by a tool with small rollers such as a pipe cutter.

In order to avoid to the extent possible any radioactive contamination of the neighborhood of the pipe 1, the two preliminary machined cuts are made first by means of the device according to FIG. 3, at levels 7 and 8, and thereafter the two cuts at levels 7 and 8 are finished with the aid of a pipe cutter; thus the interior of the pipe 1 is put into communication with the exterior only at the end of the cross cutting operation.

After the cutting out of the section, the latter is withdrawn and, in the case of a sleeve according to FIG. 2, the sleeve 5 is withdrawn at the same time.

Figure 4A:
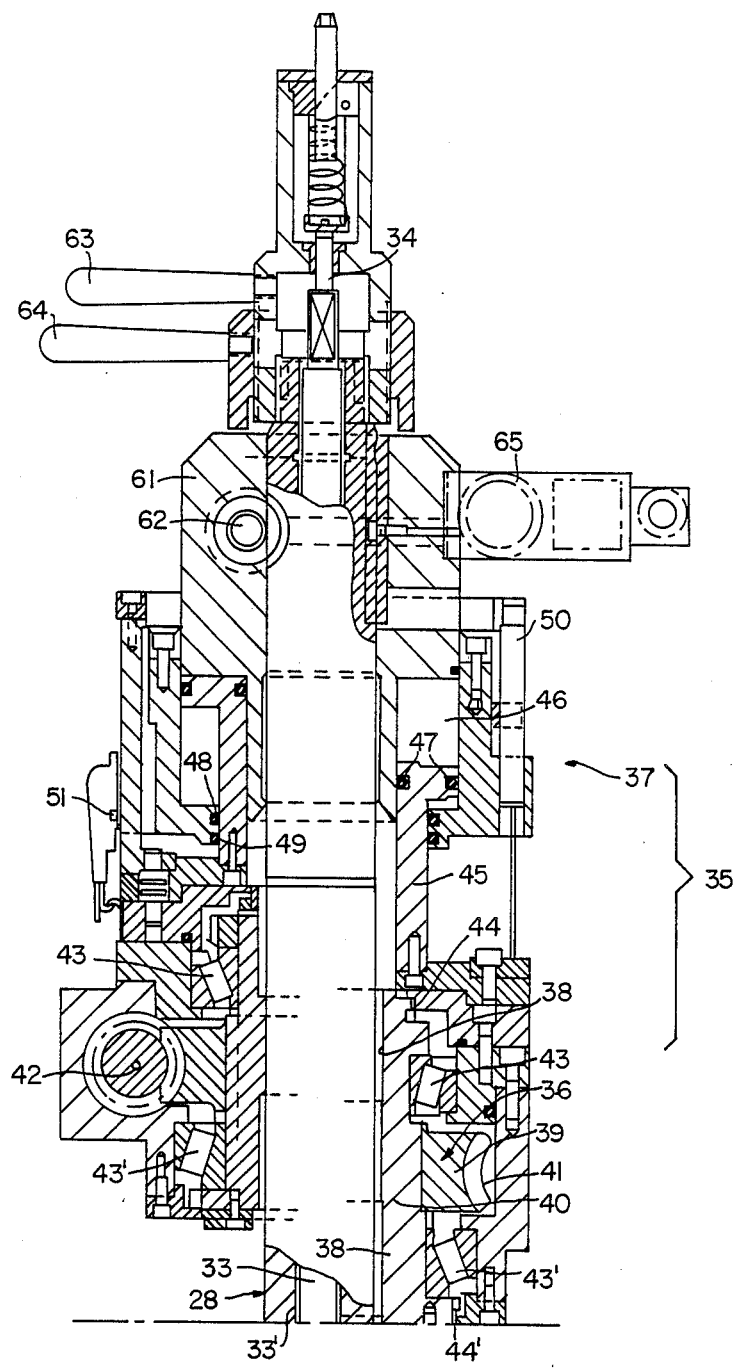
FIGS. 4a and 4b show a device for machining of chamfers on the free ends of the pipe, in accordance with the process according to the invention.
Figure 4B:
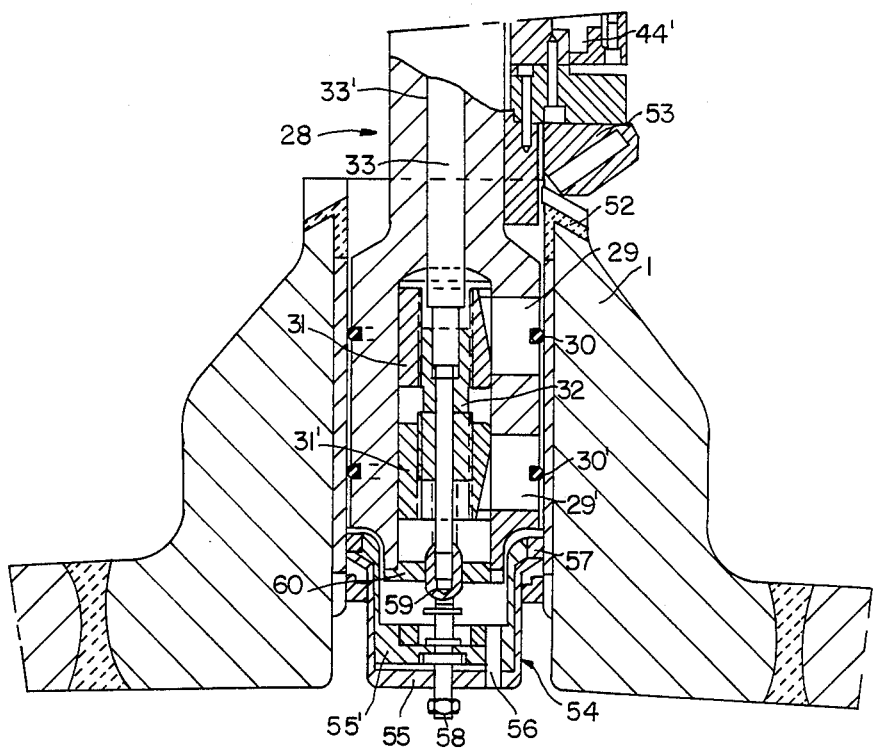

Reference is now made to FIGS. 4a and 4b. These figures show a device for machining the chamfers 52 on the free ends of the pipe 1 after the section has been removed, so as to be able to install a new section correctly.

This device includes a frame 28 having means for centering and fixing it in the interior of the pipe 1. These centering means are constituted by two levels of sectors 29, 29' at 120° kept in place by rubber gaskets 30 and 30'. Threaded cones 31 and 31' are able to press the sectors 29 and 29' against the internal wall of the pipe 1 and to fix these latter and the frame 28 into the interior of the pipe. The threaded cones 31 and 31' can be shifted by a screw member 32 having two threads of opposite hand, by means of a stem 33 which fits in an axial passage 33' traversing the frame 28 and which, at the level of the screw member 32, includes six male facets capable of cooperating with a hole with six facets formed in the screw member 32. The stem 33 abuts at its upper end against a detector 34 which permits detection of the position of the stem 33 and hence of the frame 28. It also abuts at its lower end in a bearing 59 which bears against a bolt 58 of a cup 54; the latter serves as a depth stop for the frame 28 and will be described in detail later.

The device also includes a tool support 35 mounted concentrically around the frame 28, capable of translation along the axis of the frame 28 and rotatable about the axis of the frame.

The tool support 35 is in fact constituted by a rotating part 36 and a part 37 which is capable of translation and capable of taking the rotating part 36 with it in its translation.

The rotating part 36 is mounted concentrically on the frame 28 with self-lubricating bearings 38. A ring gear 39, secured internally by splines 40, is turned by teeth 41, by means of a standard hydraulic motor 42 carried by the part 37.

The part 37 provides for the movements in vertical translation of the part 36. For this purpose, two roller bearings 43 and 43' keep the parts 36 and 37 free of each other. These bearings are protected from external influences by lip seals 44 and 44'.

The part 37 can be moved in vertical translation by means of an annular jack 45, able to move along an axis parallel to the longitudinal axis of the frame 28, by virtue of a pressure chamber 46. Liquid tightness is obtained by a toroidal seal 47 on the one hand and by a toroidal seal 48 and a lip seal 49 on the other. A displacement detector 50 gives the displacement positions of the group of parts 37 and 36.

A connecting latch 51 allows the rotating part 36 to be fixed in high position.

FIG. 4a shows, in its right-hand part, i.e., the right of the axis of the frame, the group of parts 36 and 37 in low position, and in its left part, i.e., the left of the axis of the frame, the group of parts 36 and 37 in high position.

When machining of the chamfer 52 is required, the tool 53 is fed towards the latter while detecting the position of the tool 53 by means of the displacement of the jack 45 (detected by the displacement detector 50) and by the position of the frame 28 (detected by the detector 34).

So as to ensure recovery of the debris from machining of the chamfer 52, there is a cup 54 for recovery of debris. The latter is made in two coaxial parts 55 and 55', able to slide one within the other and fitted together and guided by a centering dowel 56. The rims of the two parts 55 and 55' define and annular space in which is fixed a rubber seal 57. The bottoms of the two parts 55 and 55' are traversed by a bolt 58, the head of which abuts against the bottom of the upper part 55', and the nut against the lower face of the lower cup 55. By rotation of the bolt 58, the two parts 55 and 55' approach one another, and so do the rims of the latter; the rubber seal 57 flattens and lies against the internal wall of the pipe 1, ensuring fixing of the cup 54 in position and good liquid thickness. The cup 54 enables recovery of the debris from machining, but it also serves as a depth stop for the frame 28. In fact this cup 54 is intended to be placed within the pipe 1 before the frame 28 itself is centered in the interior of the pipe 1. Once the cup 54 has been put in place, the frame 28 is brought to abut against the head of the bolt 58 by contact of its end bearing 59, the latter being connected to the body of the frame 28 via a member 60. The end of the stem 33 reaches a position inside the bearing 59. Thus the cup 54 serves simultaneously as depth stop for the frame 28 and as means for recovery of debris from machining.

To place in position the device for machining the chamfer 1 the cup 54 is firstly centered and fixed by acting on the bolt 58. Then the frame 28 is positioned by placing the bearing 59 on the end of the bolt 58, and the sectors 29 are fixed against the internal wall of the pipe 1 by acting on the stem 33. Thereupon perfect rigidity is ensured between the part of the frame 28 which is centered in the interior of the pipe 1 and which contains the stem 33 and a cap 61 which constitutes the upper part of the frame. Safety rotational locking between the cap 61 and the lower part of the frame 28 is performed by means of a manual lever 62. As regards the levers 63 and 64, they maintain the cap 61 on the lower part of the frame, by means of a system of nut and locknut. The reference 65 indicates the hydraulic controls of the jack 45.

Figure 5:
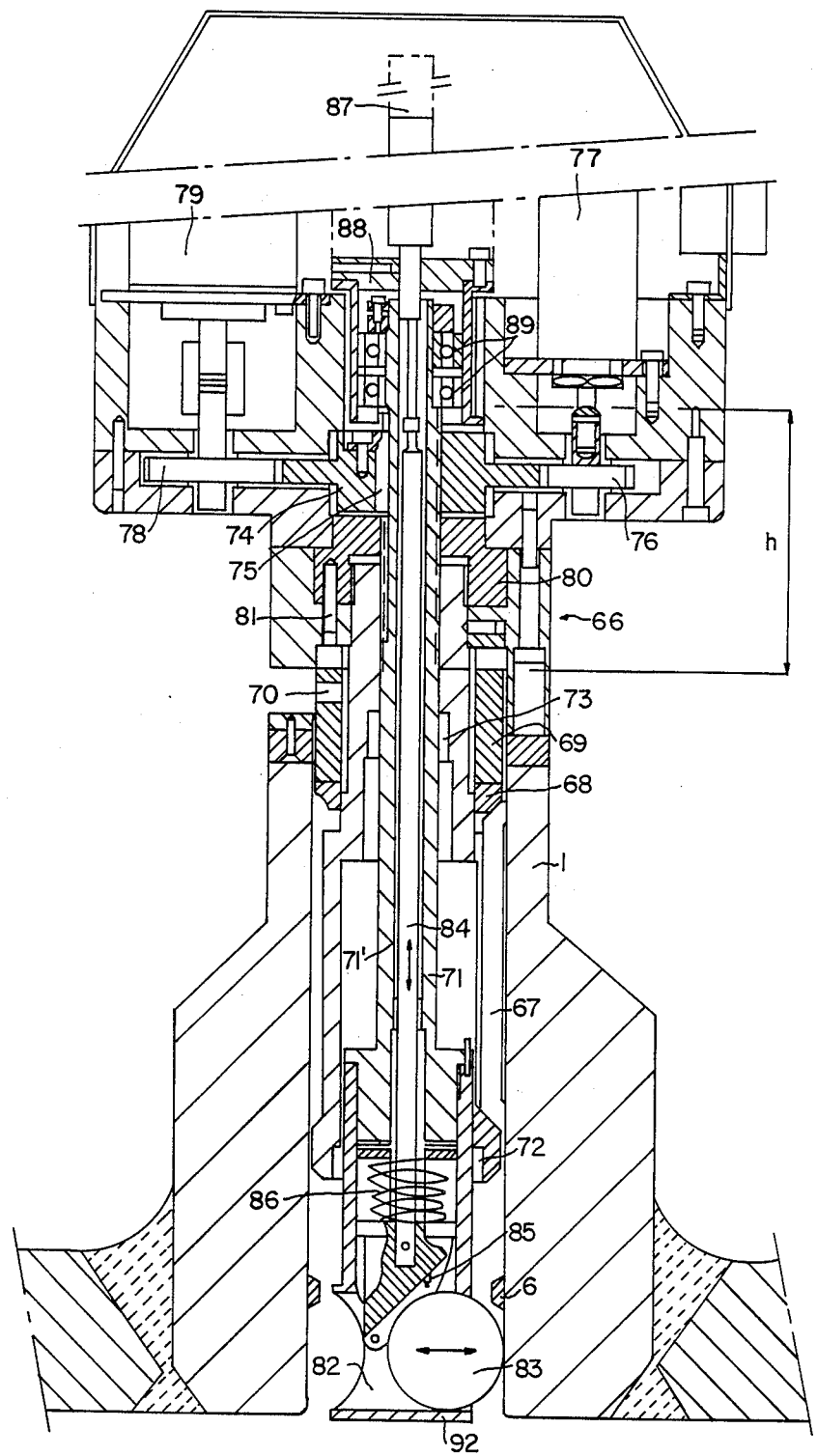
FIG. 5 shows a device for checking the position and the geometry of the blocks, in accordance with the process according to the invention.

Reference will now be made to FIG. 5 which shows a device for checking the position and the geometry of the blocks, which here are referenced 6 (as in FIG. 1), but the device would be the same for the control of the blocks 6' of FIG. 2.

The checking of the shock-absorbing blocks is in fact necessary, so as to define exactly their geometry and position, the condition of least bulk being always maintained. The new sleeve, which is to be welded in place of the sleeve 5 which has been withdrawn, is machined in accordance with the position and the geometry of the blocks 6, so that minimum play is present between the blocks 6 and the free end of the sleeve.

The control device includes a frame 66 having means for centering and fixing the latter in the interior of the pipe 1, in such a way that its axis coincides with the axis of the pipe 1. These centering means are constituted by three sectors 67 at 120° which are shifted by wedges 68 so as to bear against the internal wall of the pipe 1. The wedges 68 are connected to a nut 69 which can be rotated by means of removable pegs which are inserted into blind holes 70 and which serve as operating handles.

The frame 66 is traversed by a longitudinal bore in which is placed a support 71, in such a way that its axis coincides with the axis of the frame 66. This support 71 is movable within the frame 66 along its axis, and can turn about its axis. Self-lubricating bearings 72 and 73 enable the support 71 to slide in the interior of the frame 66 without rubbing.

A toothed wheel 74 fixed to the support 71 by a key 75 is driven in rotation by a driving pinion 76 of a motor 77. A pinion 78 diametrically opposed to the pinion 76 likewise meshes with the toothed wheel 74, and is connected to a counter 79. Thus the motor 77 enables the support 71 to be turned, and the counter 79 records each revolution made by the support 71.

Furthermore the support 71 is threaded over a height h and this thread meshes in a nut 80 centered by a dowel 81. Thus when the motor 77 turns, it not only drives the support 71 in rotation, but it also drives the latter in displacement. At each revolution that it makes, the support 71 displaces through a certain height, which is the same for each revolution and is recorded by the counter 79 at the same time as the number of revolutions. The counter 79 thus enables one to detect at every moment the position of the support 71 along its axis, and the angular position of the support 71.

At the end of the support 71 there is a bore 82, in which a ball 83 can move, perpendicularly to the axis of the support 71. The diameter of the bore 82 is of course less than the diameter of the ball 83; it enables the ball 83 to project outside the support 71, in such a way that the ball 83 can come into contact with blocks 6 and become displaced upon contact with them.

The means for indicating the position of the ball 83 along its axis of displacement, i.e., along the axis of the bore 82, are constituted by a stem 84, placed in a bore 71' traversing the interior of the support 71 and capable of sliding inside this bore, a parabolic vane 85 fixed to the end of the stem 84, and a spring 86 for urging the vane 85 against the ball 83. A detector 87 at the upper end of the stem 84 enables detection of the displacements of the vane 85 and hence the position of the ball 83 along its displacement axis.

So that the feeler 87 only detects displacements of the ball 83 along its axis, and does not indicate displacements of the stem 84 when the latter moves at the same time as the support 71, it is necessary for the feeler 87 to be displaced at the same time as the support 71. Therefore the feeler 87 is driven in displacement by the member 88 which itself is driven in displacement at the same time as the support 71, but is freed from the support 71 as regards rotation, by means of ball bearings 89.

The device of FIG. 5 thus enables one to make the ball 83 describe a helix, and thus to sweep the pipe 1 throughout its circumference, and the blocks 6 throughout their height, and to associate with every position of the ball 83 on that helix the depression of the ball 83 upon contact with the blocks 6.

Once the checking of the blocks has been carried out, a section is made, intended to be welded in place of the section which has been withdrawn, and onto that section there is welded a new sleeve according to the geometry and the position of the blocks, in such a way that the free end of the sleeve will make contact with the blocks 6 with minimum play.

Even if the pair of cross cuts have been made upstream of the weld 5a of the sleeve 5 onto the pipe 1, as in the case of FIG. 1, by reason of the position where the sleeve has been welded initially at the time of construction of the reactor, the replacement sleeve will be welded onto the section which is inserted to replace the section withdrawn.

To put the new section into place, first the latter is docked on the pipe 1 by means of a standard device of the "docking chain" type, which is fixed onto one of the portions of the pipe 1 while extensions provided with three screws at 120° center the new section. This docking is followed by internal protection by neutral gas. A device, with an inflatable balloon and a stopper providing the supply of gas, isolates the internal portion of the pipe 1 in which the first weld is to be made. Spot welding is carried out manually. The welding is done by a machine having tongs the opening of which is suited to the outline of the pipe 1. The type of welding is orbital "TIG" with filler metal. Supervision of these operations is carried out at a distance by optical fibers and video system.

Figure 6A:
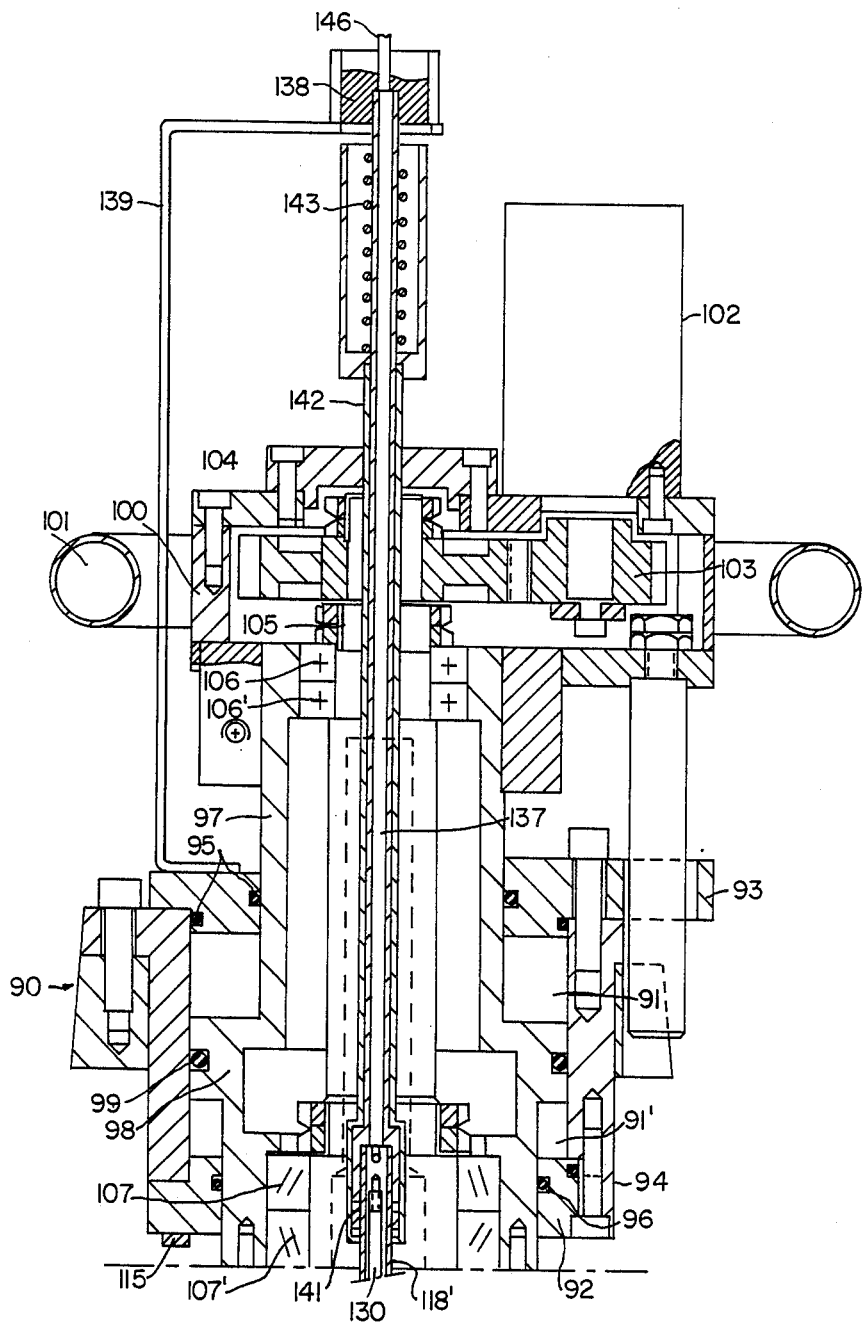
FIGS. 6a, 6b and 6c shows a device for removing the line of welding in accordance with the process according to the invention.
Figure 6B:
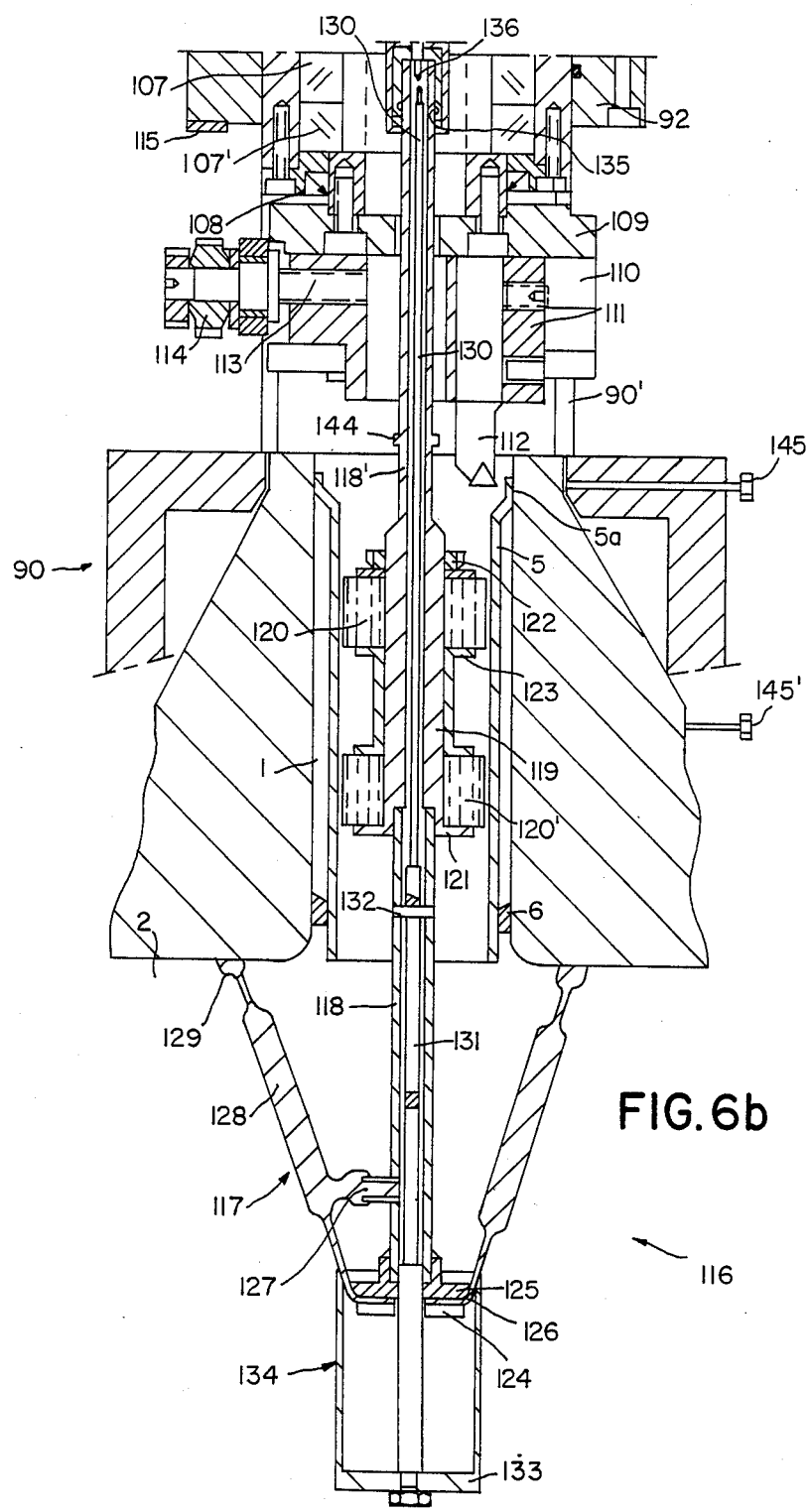
Figure 6C:
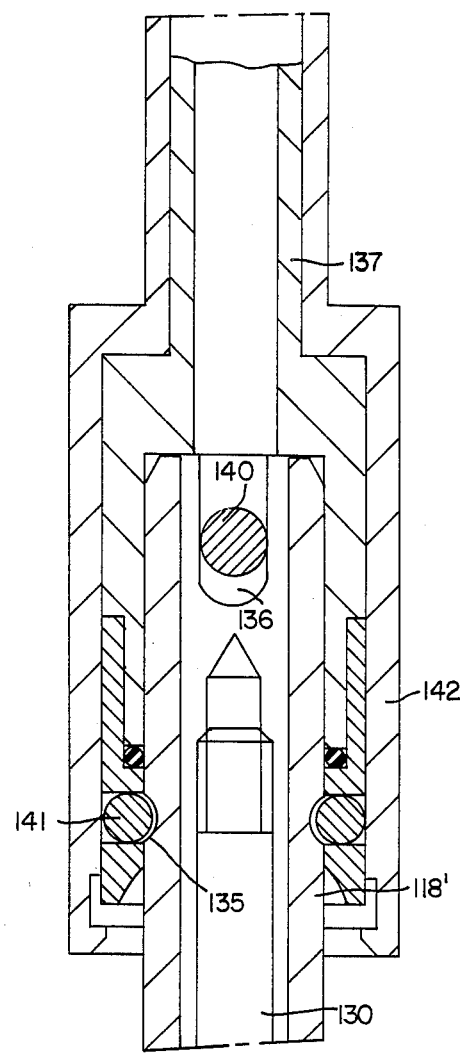

The totality of operations enabling replacement of a sleeve has just been described; however there still remains the description of the device for machining a line of welding such as the line 5a of welding of the sleeve 5 onto the connector 3 (FIG. 1). This device is shown in FIGS. 6a, 6b and 6c.

The device for removing the welding line 5a comprises a frame 90 intended to be fixed around the pipe 1 in such a way that its axis coincides with the axis of the pipe 1. The fixing of the frame 90 on the pipe 1 is performed by two sets 145 and 145' of four screws at 90°. The body of the frame 90 is extended by a supporting column 90', on which is fixed a double pressure chamber 91 and 91' multi-elements 92, 93, 94 assembled together by screws; the fluid tightness between these elements is provided by toroidal seals, upper 95 and lower 96.

A jack 97 is constituted by a hollow cylinder, on which is maintained an increased thickness 98 absorbing the various forces from the variable pressures exerted in the region of the chambers 91 and 91', and has a toroidal seal 99 to ensure fluid tightness.

The total body of the jack 97 is surmounted by a casing 100 with a handling ring 101.

A motor 102 is screwed to the casing 100, and its driving pinion 103 meshes with a pinion 104 which is fixed by nuts and locknuts on a shaft 105 which constitutes a tool support.

Guidance for the shaft 105 is provided, at the exit from the casing 100 and in the upper part of the jack 97, by means of two ball bearings 106 and 106', and in the lower part by means of two roller bearings 107 and 107' fixed by a nut and locknut. The lip seal 108 resists penetration of dust at the level of the roller bearings.

The tool support 105 is thus capable of translation by means of the jack 97 and rotation by means of the motor 102.

A tool carrier 109 is fixed on the tool support 105. The principal part of the tool 109 takes the form of a guide platen in which the groove 110 permits displacements of a carriage 111 in a direction perpendicular to the longitudinal axis of the frame 90.

A cutting tool 112 is fixed on the carriage 111. The carriage 111 also has a threaded bore in which turns a screw 113, which, by rotation of a roller 114 fixed on this screw 113, permits displacement of the carriage 111. In fact, a stationary block 115 fixed to the frame 90 makes contact with a tread on the roller 114 in the uppermost position of travel of the jack 97 relative to the frame 90.

The whole of the tool carrier 109, tool support 105, and upper casing 100 is bored throughout its height to permit the passage of a device for recovery of swarf, and which is shown in FIG. 6b. This device is constituted by an inverted umbrella 116, itself constituted by a corolla 117 of rubber having inflatable rings 128 and 129. This corolla 117 is inverted, with its point down, and is suspended on a tubular support constituted by a first tube 118 welded onto the end of a second tube 118'.

The latter has an increased thickness 119 at a level such that this increased thickness is in the middle of the height of the sleeve 5, once the umbrella 116 is in position.

Two hollow cylinders 120 and 120' of rubber, the internal diameter of which is that of the increased thickness 119, are fixed in the lower part by the end part of the tube 118' in the form of a disc 121, and in the upper part by a nut and washer 122, and are separated from one another by a spacer 123. These cylinders permit centering of the tube 118' in the interior of the sleeve 5.

In its lower part, the tube 118 is welded to a member 124 having a thread on which is engaged a nut 125 in such a way as to grip the lower part of the corolla 117 between the members 124 and 125.

The tubes 118 and 118' are pierced internally so as to permit the passage of a gas from the upper part of the tube 118' to a pipe 27 which opens into the corolla 117 to inflate the rings 128 and 129. The ring 128 imparts a certain rigidity to the corolla 117, while the ring 129 ensures the vertical locating of the corolla 117 and fluid tightness between the umbrella 116 and the walls of the pipe against which it is applied.

For positioning the umbrella 116 in the pipe 1, first the corolla is inflated so that the latter is in correct position, and then the rubber rings 120 and 120' are crushed in the interior of the pipe 1 by action on the nut 122.

In the passage pierced in the tubes 118 and 118' there can slide a stem 130, the outer diameter of which is sufficiently less than the internal diameter of the tubes 118 and 118' that a sufficient space between the stem 130 and the internal wall of these tubes permits the passage of gas for inflation of the corolla 117. The stem 130 can slide in the interior of the tube 118 through the height of a slot 131 made in the stem 130, the ends of which abut against a pin 132 fixed to the tube 118.

The lower end of the stem 130 is fixed to the base 133 of a casing 134. Hence, when the slot 131 is in contact at its upper end with the pin 132, the casing 134 is in lower position, and when the slot 131 is in contact with the pin 132 at its lower end, the casing is in raised position and, after being deflated, the corolla 117 can fold up into the interior of this casing, which allows its extraction from the pipe 1 at the end of the operation.

The upper end of the tube 118 has a circular groove 135 and a slot 136, which enable the tube 118 to be fixed to a tube 137 fixed to the frame 90 (see FIG. 6a).

The tube 137 is fixed by a resin 138 onto a U-shaped spacer 139 which rests on the frame 90.

The connection between the tube 118 and the tube 137 is made as follows: the slot 136 cooperates with a pin 140 (see FIG. 6c) fixed on the tube 137, thus ensuring prevention of rotation of the tube 118 if there should be a failure of the fixing of the tube 118 by the rubber rings 120 and 120'; balls 141 engage in the groove 135 under the action of a sleeve 142, urged by a spring 143, which ensures vertical fixing.

The installation of the machining device, and of the umbrella for recovering debris, comprises the following phases:

First the umbrella 116 is put in position as follows: the umbrella 116 suspended on the tube 118' is introduced by hand into the pipe 1, until the lugs 144 on the tube 118' (see FIG. 6b) are at the level of the entrance to the pipe 1. Then a source of gas is placed at the upper end of the tube 118'. The gas starts to inflate the corolla 117, which starts to engage the internal surface of the pipe. In the particular case of FIG. 6b, this corolla engages against the internal wall of the pipe 2 into which the pipe 1 opens. Then the nut-washer unit 122 is tightened, which has the direct effect of crushing the rubber cylinders 120 and 120' and of fixing the device in the sleeve 5. The umbrella 116 is thus centered and fixed in the correct manner. Then the corolla 117 is deflated and the supply of gas is withdrawn.

Thereafter the frame 90 is put in position; which engages with the pipe 1 and centers itself by means of screws 145 and 145'.

While the frame 90 is being inserted, the connection between the tube 118' and the tube 137 is made as described above, by means of the groove 135 and the slot 136.

Then the supply of gas is coupled to the upper end 146 of the tube 137.

The corolla 117 is inflated.

The device is then ready to remove the line of welding 147.

The diameter of the cut made is determined by the number of turns made by the roller 114 on the block 115, while the tool carrier 109, and hence the jack 97, are in upper position. The cuts are made from above downwards by displacement of the jack 97 at slow speed. The movements of the jack 97 to carry the tool carrier 109 to upper position are in themselves performed at high speed.

After complete removal of the line of welding, the frame 90 is withdrawn and then the umbrella 116 by unscrewing the nut 122 and then pulling the stem 130 upwards, so that the corolla 117 folds up into the casing 134. Then the sleeve 5 can be withdrawn, followed at once by dimensional checking of the blocks 6 as described above.

The invention which has been described exhibits numerous advantages.

It permits replacement of the thermal sleeves in a limited time and without introducing debris into the pipe 1. The invention permits the replacement of sleeves to be carried out even in pipes which are difficult to reach, and in pipes in a radioactive area. In enables any type of sleeve to be replaced, even if it is difficult to cut a section from the pipe 1 the ends of which are situated on both sides of the weld of the sleeve to the section, as in FIG. 1.

The invention in not limited to the embodiments which have been described solely by way of example, but covers equally other designs which may differ from it only in details, by variations in construction, or by the use of equivalent means.

Thus, the cross cutting device could include only one tool carrier and hence only one tool 14.

Also, the means for stopping the feeding movement of the tool support 13 or 13', before the tool 14 or 14' breaks into the interior of the pipe 1, may be different: they may include, in addition to the indicator 26, an auxiliary indicator capable of advancing at the same time as the indicator 26, along the same line as this indicator 26 but in the direction opposite to that of feed of the tool support 13; then the detector 27 would detect the position of the auxiliary indicator and not that of the indicator 26; this detector would be less bulky because it would be placed on the other side of the tool carrier 13 relative to the pipe 1.

The detector 26 and the auxiliary detector could be made in the form of two inverted rack bars, one placed in a predetermined position relative to the pipe 1, and the other placed in a predetermined position relative to the detector 27.

What is claimed is:

1. Device for performing a cross cutting operation with removal of material of a pipe having an axis of symmetry, said device comprising:
   (a) a frame in two parts having an axis of symmetry and fixable around the external wall of the pipe in such a way that the axis of the frame coincides with the axis of the pipe;
   (b) a rotating element in two parts, each carried by one part of the frame, rotatable about the axis of the frame;
   (c) at least one support for a cross cutting tool carried by the rotating element but movable in translation towards the axis of the frame;
   (d) means for turning the rotating element about the axis of the frame;
   (e) means for moving the tool support towards the axis of the frame; and
   (f) means for stopping the movement of the tool support towards the axis of the frame just before the tool can break into an interior space of the pipe;
   said means for stopping being constituted by an indicator fixed to the tool support, a detector of the position of the indicator, fixed to the frame, and means for controlling the stopping of the movement of the tool support when the indicator reaches a predetermined position.

2. Device as claimed in claim 1, wherein the means for moving the tool support are constituted by
   (a) a worm engaging a threaded part of the tool support and drivingly connected in rotation with a fork, a free end of which has a roller moving on a circular track on the frame;
   (b) means placed on said track to raise the roller at each revolution made by the rotating element thus turning the fork; and
   (c) means for making the worm turn only in a direction corresponding to the movement of the tool support towards the axis of the frame.

* * * * *